No. 700,339. Patented May 20, 1902.
F. KLEPETKO & W. J. EVANS.
ROASTING FURNACE.
(Application filed Aug. 8, 1900.)
(No Model.) 5 Sheets—Sheet 1.
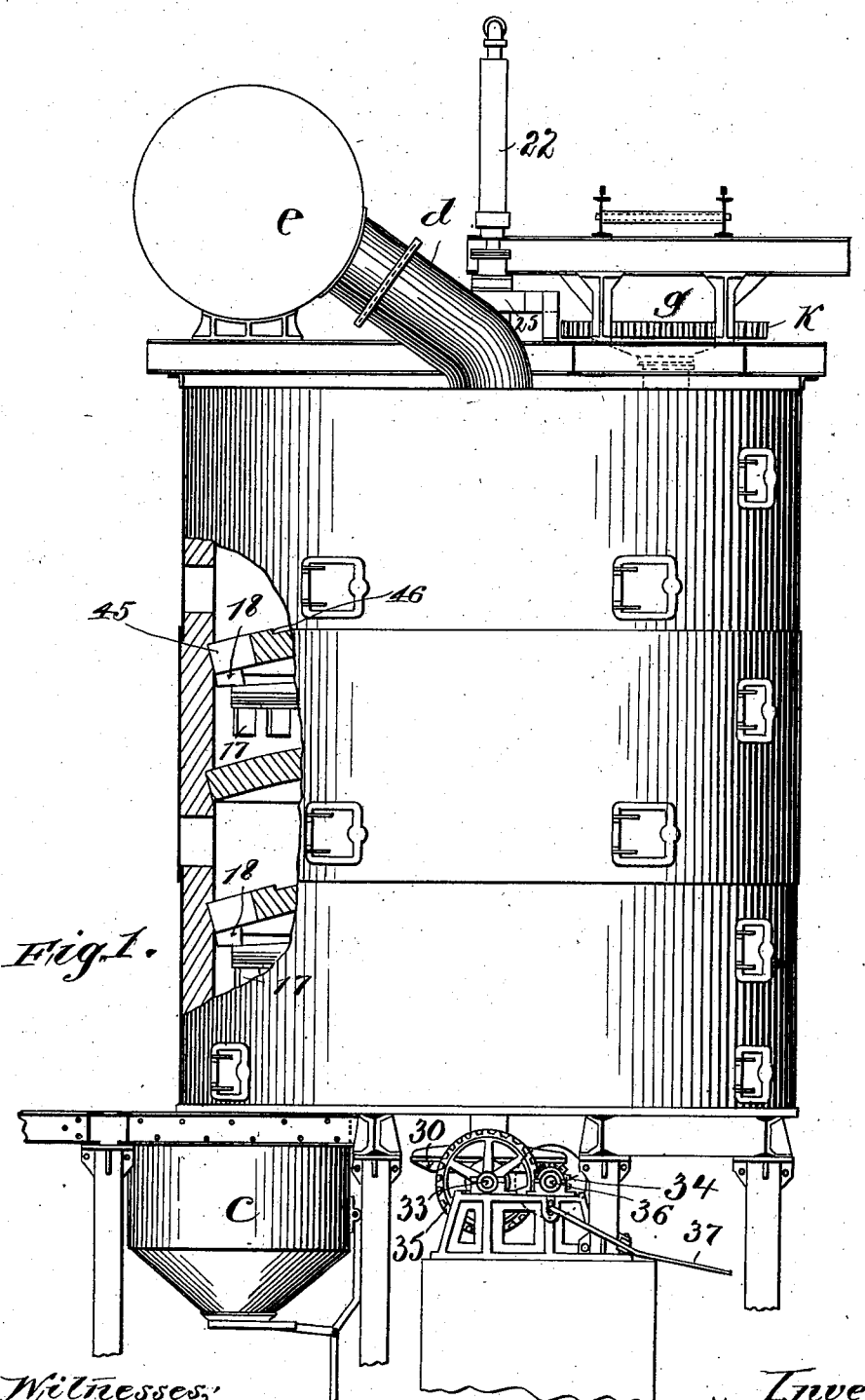
Fig. 1.

No. 700,339. Patented May 20, 1902.
F. KLEPETKO & W. J. EVANS.
ROASTING FURNACE.
(Application filed Aug. 8, 1900.)
(No Model.) 5 Sheets—Sheet 3.

Witnesses:
Chas. W. Benjamin
Henry S. Morton

Inventors
Frank Klepetko
and William J. Evans
by
atty

No. 700,339. Patented May 20, 1902.
F. KLEPETKO & W. J. EVANS.
ROASTING FURNACE.
(Application filed Aug. 8, 1900.)
(No Model.) 5 Sheets—Sheet 4.

Witnesses:
C. W. Benjamin
Henry S. Morton

Inventors
Frank Klepetko
and William J. Evans
by [attorney signature]
atty.

THE NORRIS PETERS CO., PHOTO-LITHO., WASHINGTON, D. C.

No. 700,339. Patented May 20, 1902.
F. KLEPETKO & W. J. EVANS.
ROASTING FURNACE.
(Application filed Aug. 8, 1900.)
(No Model.) 5 Sheets—Sheet 5.
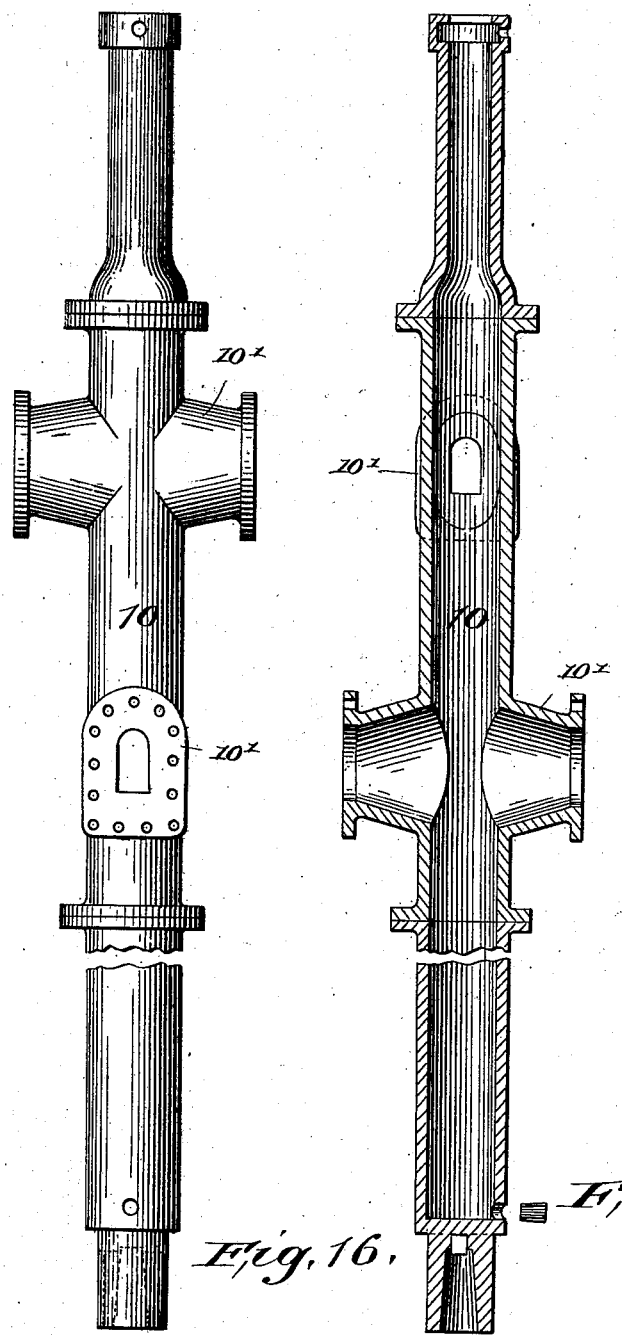
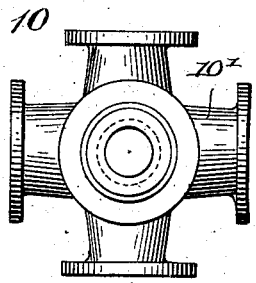
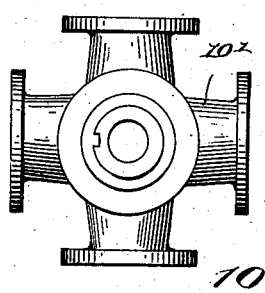

UNITED STATES PATENT OFFICE.

FRANK KLEPETKO AND WILLIAM J. EVANS, OF GREATFALLS, MONTANA.

ROASTING-FURNACE.

SPECIFICATION forming part of Letters Patent No. 700,339, dated May 20, 1902.

Application filed August 8, 1900. Serial No. 26,287. (No model.)

*To all whom it may concern:*

Be it known that we, FRANK KLEPETKO and WILLIAM J. EVANS, of Greatfalls, county of Cascade, State of Montana, have invented certain new and useful Improvements in Roasting Furnaces, of which the following is a description, referring to the accompanying drawings, which illustrate one preferred form of the invention.

The use of the furnace is not necessarily limited to roasting, though that is its intended use as at present designed.

The improvements which constitute the present invention concern mainly the apparatus for feeding material into the furnace, the stirring apparatus and means for keeping it cool, and certain novel contrivances which will be more fully understood in connection with the description of the drawings.

The object of the invention is to improve the construction, durability, and operation of the furnace and its several parts and to increase its efficiency.

Figure 2:
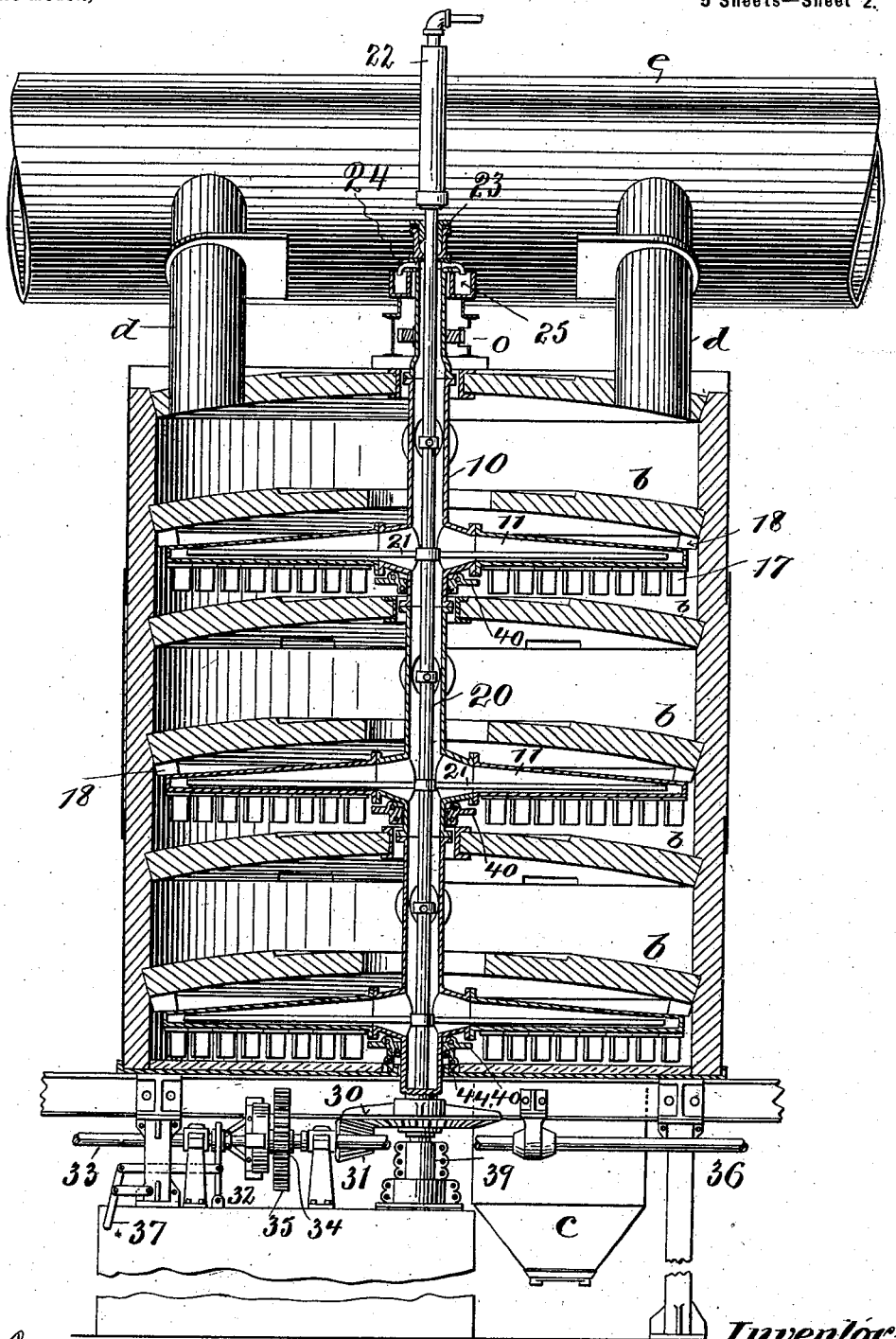
Figure 3:
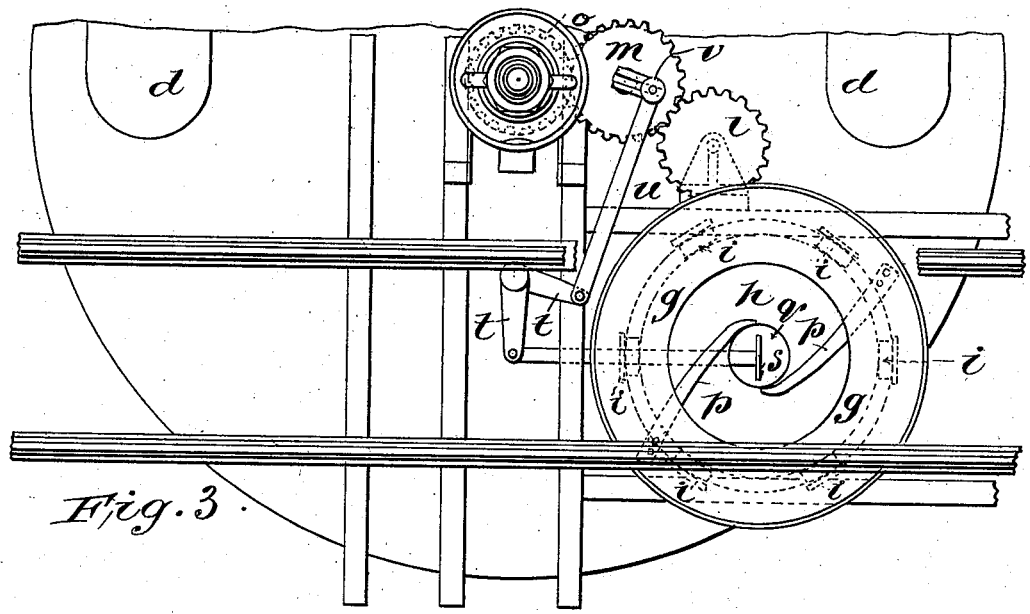
Figure 4:
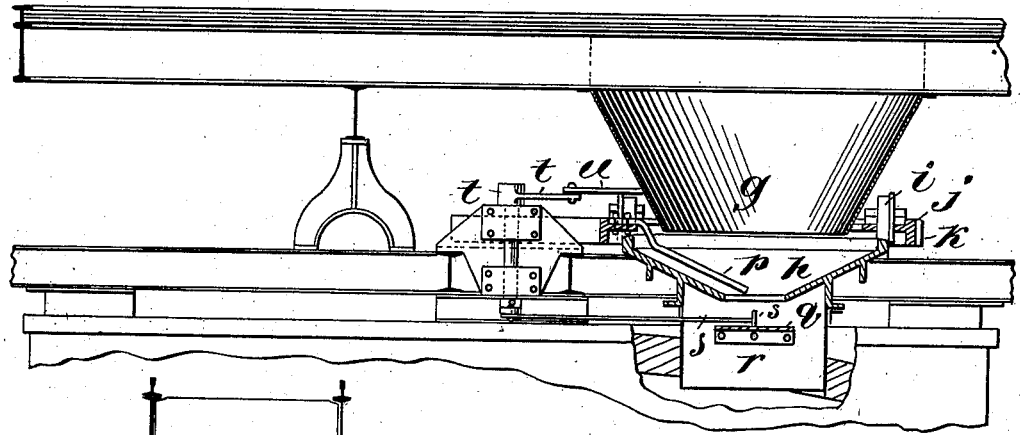
Figure 5:
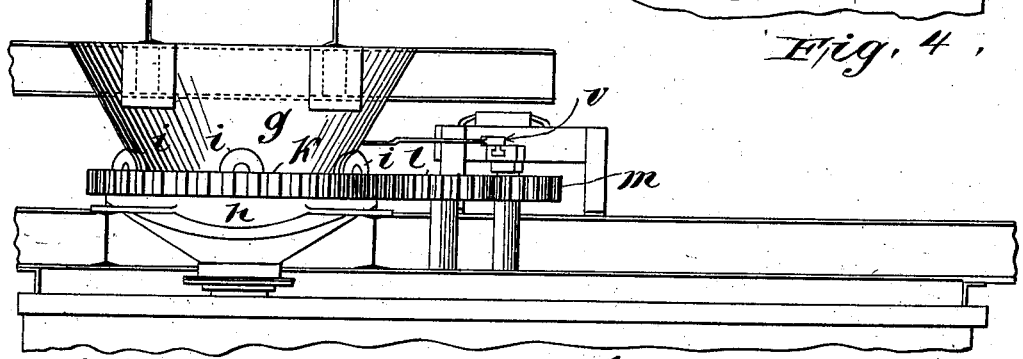
Figure 6:
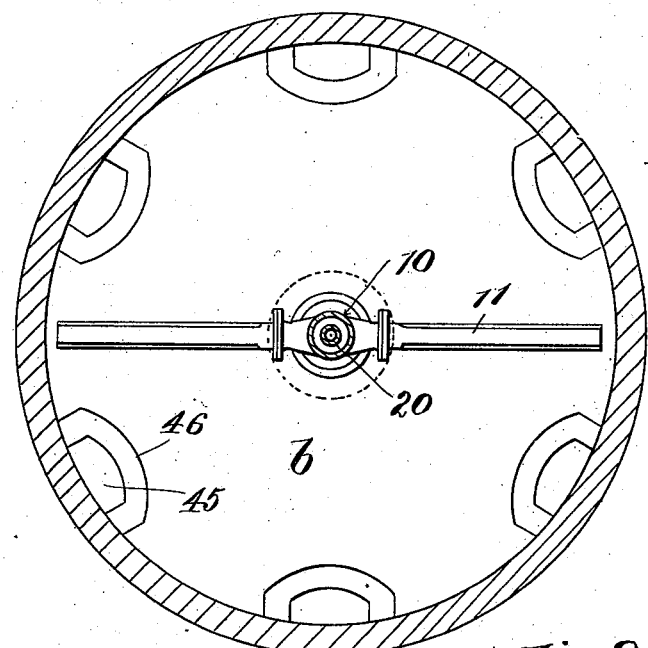
Figure 7:
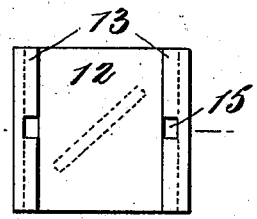
Figure 8:
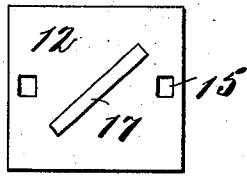
Figure 9:
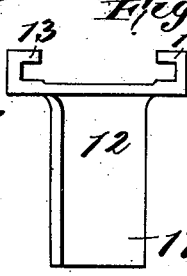
Figure 10:
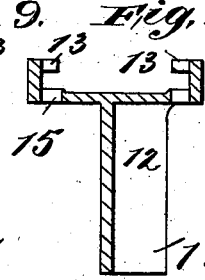
Figure 11:
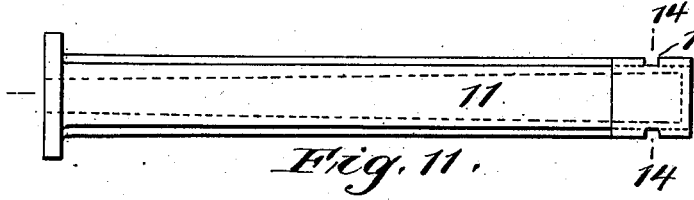
Figures 13, 14:
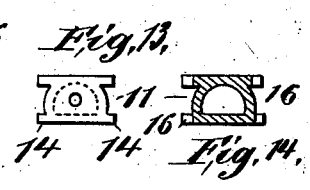
Figure 12:
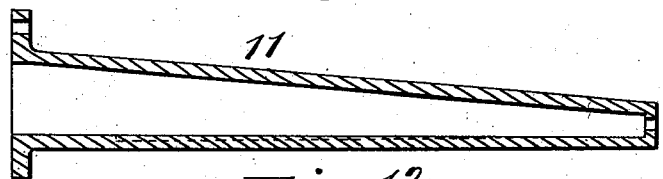
Figure 15:
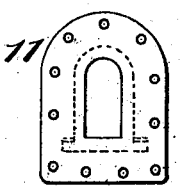

In the drawings, Figure 1 is an elevation, partly in section, with some of the details omitted for clearness. Fig. 2 is a vertical central section at right angles to the elevation shown in Fig. 1 and with parts broken away to show details and the upper bearings of the shaft 10 omitted. Fig. 3 is a partial plan view showing the feeding mechanism with some of the parts broken away or omitted for clearness. Fig. 4 is a detail view partly in central vertical section through the feeding apparatus. Fig. 5 is a detail elevation of the feeding apparatus viewed from the right hand of Figs. 3 and 4. Fig. 6 is a horizontal section through the furnace above the second hearth, showing the revolving stirrers or rakes, but with the detachable stirring-teeth removed. Figs. 7 and 8 are top and bottom views of one of the stirring-teeth on a greatly-enlarged scale. Figs. 9 and 10 are end view and section of the same. Figs. 11 and 12 are plan view and vertical section of one of the stirring-arms. Fig. 13 shows the end of one of the stirring-arms. Fig. 14 is a cross-section of the plane 14 14 of Fig. 11. Fig. 15 is a view of the inner end of one of the arms. Figs. 16 and 17 are elevation and vertical section of the hollow shaft that carries the stirring-arms, and Figs. 18 and 19 are plan view and inverted view of the same.

Throughout the drawings like letters of reference refer to like parts.

With the outside shell of the furnace and the detail of hearths $b$ the present invention is not particularly concerned. These features are not in themselves claimed as novel. The material is fed onto the uppermost hearth and by the action of the stirring-arms is carried toward the center, where it drops through onto the next hearth. On the second hearth the stirring arms or rakes feed the material gradually outward until it drops through the marginal opening in the hearth onto the third hearth, where it is fed toward the center, and so on throughout the furnace until it is delivered into the delivery-hopper $c$. The flames and gases escape from the furnace through the passages $d$ into the large horizontal passage $e$.

We will now describe our novel feeding device and then the stirring and water-circulating system.

The feeding device is partially shown in position in Fig. 1; but its details will be best seen in Figs. 3, 4, and 5.

Rails or tracks are placed in suitable position to permit the bringing and dumping of material into the hopper $g$, through which the material falls onto the less steeply inclined hopper-plate $h$. Concentric with this latter and preferably mounted upon it by friction-reducing wheels $i$ is a ring $j$, having external gear-teeth $k$, which mesh with and are driven by gear $l$. This gear $l$ is in turn driven by gear $m$, which meshes with gear $o$ on the revolving stirring-shaft. The means by which the stirring-shaft is driven will be presently described. The ring $j$ being rotated as described carries arms $p$, which project down into the hopper $h$, and thereby constantly agitate and loosen the material resting on the hopper $h$, so that it falls onto the plate $q$. The material is mechanically fed off plate $q$, so as to drop through the opening $r$ to the first hearth, by means of a reciprocating rake $s$, which moves to and fro upon the plate $q$ and is actuated by bell-crank $t$, link $u$, and wrist-pin $v$. The wrist-pin $v$ is mounted to revolve with the gear $m$ and is preferably radially adjustable in a slot, as indicated in the drawings, so as to render the reciprocation of the rake s variable in extent, and thereby regulate the feed. The dimensions of the plate q, as will be seen, are such as to prevent the material in the hopper h dropping through without the mechanical assistance of the rake s, so that the rake s in its adjustment forms a means of nicely controlling the rate of feed. The material in the hopper h, though granular or in blocks, serves practically to prevent the escape of gases upward through the opening r and hopper h.

Turning now to the stirring-shaft, which stands vertically at the center or axis of the furnace, as shown at 10, it will be seen that this shaft carries the gear o, by which the feeding mechanism is actuated. This shaft 10 consists of a number of hollow sections, to which are secured the pairs of radial arms 11, which extend over the several hearths. In Fig. 2 the arms on alternate hearths are hidden from view, as they extend directly back of the shaft in the position shown. The details of these arms are clearly shown in Figs. 11, 12, 13, 14, and 15. They are closed at the outer end save a small plug-hole, which is provided for giving access to the interior. The rake-teeth or stirrer-teeth 12, instead of being cast integral with the arms 11, are each provided with flanges 13, which fit over and slide onto the coöperating flanges 14 on the arms 11. When the requisite number of teeth have been strung onto the arm, the outer or end tooth, or, if desired, all the teeth, may be wedged firmly in place, openings 15 in the flanges of the teeth and corresponding openings 16 in each of the arms being provided for the purpose. It will be understood, of course, that the blades or teeth proper, 17, are inclined to the radial line, so as to feed the material gradually toward or away from the center of the hearth in addition to agitating and stirring it. The teeth for alternate hearths are of course inclined in opposite directions, because the material is fed toward the central opening in one hearth and toward the marginal opening in the next hearth. In addition to these teeth 12 17 there are provided upwardly-extending blades 18, Fig. 2, which are secured on the upper side of the arms 11 at the extreme end in position to prevent or remove accretions on the roof or the side walls of the hearths. The number of arms and of the blades or teeth is not limited, except by practical considerations.

The hollow shaft 10 is closed at the bottom, and throughout its length extends a water-pipe 20, provided with open-ended distributing-pipes 21, extending throughout each of the stirring-arms 11. The pipe 20 of course turns with the shaft 10, and therefore a joint is provided to permit this turning, or the pipe may carry an enlarged length of the piping 22, open at its upper end, which is kept filled with water. Around the pipe 20, at the upper end of the hollow shaft 10, is a packing-box 23. To permit the water to escape from the hollow shaft 10, overflow-taps are provided at 24, delivering into a stationary trough 25, from which the water may be suitably conducted as desired. The water delivered into the pipe 22 passes down through pipe 20 and pipes 21 to the ends of the several arms and thence flows back into the hollow shaft 10, filling and cooling all the arms and the whole interior of the shaft 10, and thence overflows through the taps 24.

Beneath the furnace the shaft 10 is mounted in and turns with a bevel-gear 30, which is driven by bevel-gear 31. Bevel-gear 31, in turn, is driven by friction-clutch 32 on shaft 33, which carries the bevel-gear 31. Reduction-gearing 34 35, driven from shaft 36, serve to give continuous rotation to one member of the friction-clutch, while the other member, which turns with the shaft 33 and bevel-gear 31, may be thrown into and out of engagement by means of the hand-lever 37 and the usual connection. The weight of the shaft 10 is carried by the bearing 39 beneath the bevel-gear 30.

To prevent the material in the furnace leaking through around the shaft 10 from the hearths which have marginal delivery-openings and also from the bottom hearth, projecting collars or flanges 40 are secured to the shaft 10 in position to overlie the shaft-openings in the hearth. At the bottom hearth a coöperating stationary collar 44, which loosely fits the revolving collar 40, is provided.

The apparatus for heating the furnace and other features which are not directly connected with our improvements are, to a large extent, neither shown nor described, because they do not aid in illustrating or explaining such improvements; but from what we have described it will be clearly understood how our several novel features are constructed and operated. When the material is delivered through the hopper g, it is constantly broken up and agitated by the arms p; but it is fed through to the furnace only so fast as the reciprocating rake s permits and determines. Dropping from the plate q it passes under the successive stirring-arms on the successive hearths until it reaches and is discharged from the lowermost hearth. The hollow shaft 10 being driven from beneath and in turn driving the feeding apparatus insures a proper proportioning at all times between the rate at which the material is fed into the furnace and the rate at which the stirring-arms act. The stirring action and the feeding-in action can be regulated relatively to each other by means of the adjustable wrist-pin v, which governs the action of the feed-rake s. As a result of the constant flow of cooling-water through the arms and the delivery of the cool water to the ends of the arms we are able to run our furnace at a much higher temperature than has heretofore been done without danger of twisting or warping the arms, and as a result of this difference we have increased the capacity of a single furnace of certain size from seven to eight tons per day of twenty-four hours up to forty tons per day.

The marginal openings of the hearths which discharge the material at points adjacent to the inner walls of the furnace are shown at 45 in Figs. 1 and 6, each opening being surrounded by a thickened ledge 46. These details, though herein referred to, are old and well known and are mere incidents in the construction of furnaces of this type.

As previously stated, the radial arms 11 are secured to the rotating shaft 10. To insure a maximum rigidity for the arms and their connection to the shaft under the high temperature to which they are ordinarily subjected, the connection is effected by coupling the arms to the conical peripheral enlargements or bosses 10', formed on each section of the shaft, the inclined wall of this enlargement better resisting any binding strain or strain of compression to which it may be subjected. The arm itself is, moreover, constructed to insure a maximum rigidity therefor by making the bottom thereof plane or flat and the remaining peripheral portion curved and flaring toward the base of the arm, the plane portion being extended laterally to form the flanges 14, along which the stirrer-teeth 12 are strung and by whose flanges 13 the extensions 14 are directly embraced.

While the manner of the water circulation within the shaft 10 has been referred to in a general way, it will be well to advert to the specific construction of the pipe 20, pipes 21, and arms 11, by which such circulation is insured. As stated above, the pipe 20 rotates with the hollow shaft 10 resting, as it does, on and being closed by the bottom of said shaft, (though the lower end of the pipe 20 may be closed by a plug or any other way.) The pipe being thus closed causes the water to rush under the full pressure of the hydrostatic head in said pipe into each of the distributing-pipes 21, being forced by the same head through and out of each of said distributing-pipes into the hollow arms 11, the water (and any steam accompanying the same) thence following the upper inclined flaring peripheral walls of said hollow arms, back to the shaft 10, finally discharging, as shown, at a point adjacent to the feed end of the feed-pipe, so that the arms 11, while constructed to resist any strains which would have a tendency to cause them to bend or sag, are likewise constructed to afford the easiest circulation for the stream of water (and steam, if any) issuing from the ends of the distributing-pipes 21, this path of the circulation being further assured by the proximity and parallelism of the pipes 21 to the flat bottoms of the hollow arms 11.

The object of having more than one discharge passage or flue $d$ leading from the upper hearth is to insure uniform drying of the product delivered to the upper hearth, the bulk of the drying being accomplished in this hearth. The plurality of the discharge-passages insures a more even distribution of the hot furnace-gases, and thus a more uniform drying results.

Having described our invention, what we claim is—

1. In a furnace of the class described, a hearth, a roof therefor, a hopper thereabove having a constricted opening, means for agitating the material to be treated in the opening of said hopper consisting of rotary stirrer-arms projected from the upper outer edge of said hopper to the discharge-opening thereof, and separate means for feeding the material from said hopper to said hearth, substantially as set forth.

2. A roasting-furnace having a hearth and roof, a central vertical stirring-shaft therein, a stirring-arm arranged on said shaft beneath and near said roof and extending over the hearth, and an upward projection on said arm in position to remove accretions from the roof, substantially as set forth.

3. In a furnace having a plurality of hearths, a rotatable hollow shaft passing through the hearths, a series of hollow arms radiating from said shaft and extending into the several hearths, an inner water-feed pipe located within and rotatable with the shaft, a series of branches or distributing-pipes leading from said feed-pipe and communicating with the interior of the hollow arms for returning the water of circulation through the hollow shaft to a point adjacent to the feed end of the feed-pipe, substantially as set forth.

4. In a furnace having a plurality of hearths, a rotatable hollow shaft passing through the hearths, a series of hollow arms radiating from said shaft and extending into the several hearths, an inner water-feed pipe closed at the bottom, located within the shaft and rotatable therewith, a series of branches or distributing-pipes leading from said feed-pipe and communicating at their outer ends with the interior of the hollow arms, for returning the water of circulation through the hollow shaft to a point adjacent to the feed end of the feed-pipe, substantially as set forth.

5. In a roasting-furnace, a rotatable shaft, one or more arms carried thereby, flanges formed on either side of said arms and a series of removable stirring-teeth embracing said flanges, substantially as set forth.

6. In a roasting-furnace, a rotatable shaft, one or more hollow arms carried thereby, said arms having a substantially plane bottom and flaring peripheral walls, an inner water-feed pipe within the shaft, a series of branches or distributing-pipes leading from said feed-pipe and communicating with the interior of the hollow arms for returning the water of circulation through the arms and through the shaft to a point adjacent to the feed end of the feed-pipe, and causing the ascending currents of the water to follow the flaring walls of said hollow arms, substantially as set forth.

7. In a roasting-furnace, a rotatable shaft, one or more arms carried thereby, said arms having a flat bottom and peripheral upwardly-flaring walls, lateral flanges forming extensions of said bottom, and a series of stirring-teeth embracing said flanges, substantially as set forth.

8. In a roasting-furnace having a plurality of hearths, a rotatable shaft passing through the hearths, arms radiating from said shaft, a series of stirring-teeth carried by said arms, a feed-hopper for the upper hearth, and a plurality of discharge flues or passages leading from said upper hearth whereby uniform drying results are insured, substantially as set forth.

Signed this 25th day of July, 1900, at Anaconda, Montana.

FRANK KLEPETKO.
WILLIAM J. EVANS.

Witnesses:
EMELINE B. SPRATT,
C. H. REPATH.